C. L. JORDAN.
VEHICLE SPRING.
APPLICATION FILED MAY 12, 1913.

1,084,090.

Patented Jan. 13, 1914.

WITNESSES:
Charles Pickles
Thos Cosling

INVENTOR
Christopher L. Jordan,
BY G. Helting.
ATTORNEY.

UNITED STATES PATENT OFFICE.

CHRISTOPHER L. JORDAN, OF SAN FRANCISCO, CALIFORNIA.

VEHICLE-SPRING.

1,084,090.　　　Specification of Letters Patent.　　Patented Jan. 13, 1914.

Application filed May 12, 1913. Serial No. 766,943.

*To all whom it may concern:*

Be it known that I, CHRISTOPHER L. JORDAN, a citizen of the United States, residing in the city and county of San Francisco and State of California, have invented new and useful Improvements in Vehicle-Springs, of which the following is a specification.

My invention relates to vehicle springs, and is especially adapted to springs for automobiles where there is often excessive vibration and danger of rupture to the springs, besides the disagreeable shocks to those using the vehicle.

It is the object of my invention to provide a spring mounting for such vehicles, which is so constructed that the shocks and vibration of travel will be greatly reduced, and to provide certain connections which will be especially advantageous to the mounting of the springs.

The invention comprises the combination of two spring members and an interposed elastic connection; it also comprises details of construction to be more fully explained by reference to the accompanying drawings, in which—

Figure 1:
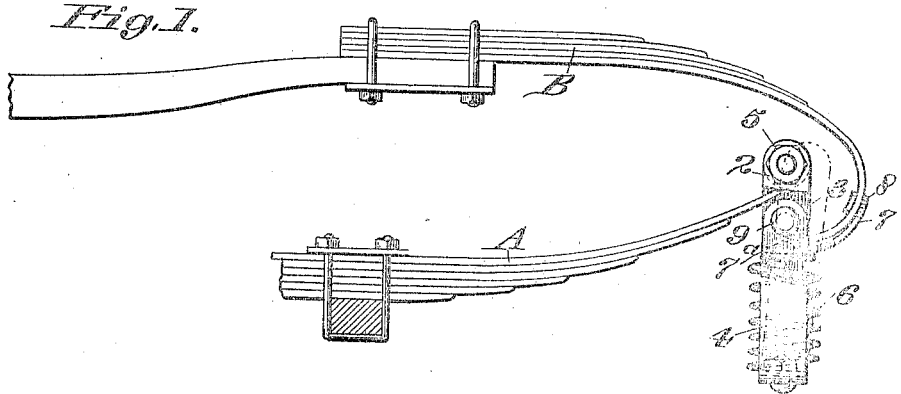
Figure 2:
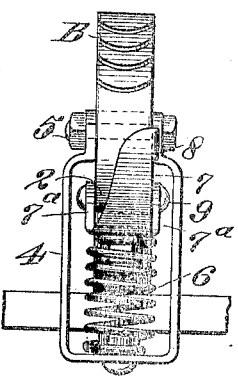
Figure 3:
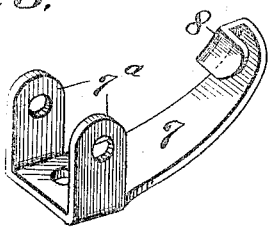

Figure 1 is a side elevation showing the rear spring connection. Fig. 2 is an end view of same. Fig. 3 is a perspective view of the reinforcing plate 7.

Springs of the class for which my invention is applicable consist of a main spring resting upon the axle of a vehicle, and a partial spring inverted above the main spring, which springs are usually connected together at their junction by a coupling link, the springs being known as semi- or three-quarters elliptic.

In my invention A is the main or lower spring, and B the upper one. Each spring has an eye, as at 2 and 3, and the upper spring is curved around into a C-shape, so that the eye of that spring when in position is in line approximately below the eye 2 of the main spring. These springs are connected together as follows: 4 is a metal yoke, the open ends of which are swivelly secured by a bolt 5 to the eye at the end of the main or lower spring. This yoke is preferably curved outwardly so as to leave a wider space between its vertical portions, and the lower end of the yoke is united continuously with the sides so that it forms a substantially U-shaped portion. The connection between the two springs is formed by means of a spiral or helical spring 6, the lower end of which rests upon and is secured on the lower transverse portion of the yoke 4, and the upper end is similarly secured to the eye of the upper spring member B, so that any depression of the spring will be communicated to this intermediate spring 6 and correspondingly depress the latter, and in so doing will separate the ends 2 and 3 of the two spring members. The recoil or return of the spring will first act upon this supplemental spring, and when a vehicle is moving if any obstacle tends to check the movement of the wheels over the ground the momentum of the body which is carried between the upper spring members B will give it a tendency to swing forward and back with relation to the axle and wheels; and this tendency is provided for by the peculiar connection of the spring eyes 2 and 3 by the yoke 4 and interposed spring 6, which substantially acts as a coupling with a certain amount of forward and backward movement. As movements of this kind will produce some strain upon the curved end of the spring B, I have reinforced this part by means of a plate 7, the outer end of which is clipped around the spring, as shown at 8, and the inner end is pivotally secured by a pin 9 which passes through the eye 3 of the spring B. This plate is constructed with upturned lugs 7ᵃ for this purpose which clasp both sides of the eye of the spring being secured by the bolt 9 which passes through the eye, and holds them securely together; the lower part of the plate is flattened and slightly removed from the curvature of the spring, thus forming an attachment for the upper end of the spring 6, and with the part 7 extending along the spring B it forms a reinforcement which will prevent any injurious strain upon the spring. The yoke 4 is made sufficiently stiff and is especially effective in preventing side sway of the parts when turning curves, the springs working freely at all other times.

Having thus described my invention, what I claim and desire to secure by Letters Patent is:

A vehicle spring including two opposed spring members having their independent ends located in a substantially vertical line, a yoke having its upper end pivoted to the end of the lower spring, a spiral spring seated on the transverse lower part of the yoke, and the upper end pivotally connected with the end of the upper spring, and a reinforce for said upper spring end, said reinforce having upturned side lugs at one end bolted to the spring end, and curved to fit the contour of the spring, the outer end forming a transversely curved hook, rigidly clamping the upper spring leaf.

In testimony whereof I have hereunto set my hand in the presence of two subscribing witnesses.

CHRISTOPHER L. JORDAN.

Witnesses:
 JOHN H. HERRING,
 W. W. HEALEY.